No. 796,986. PATENTED AUG. 15, 1905.
J. BRUK.
LAWN MOWER.
APPLICATION FILED DEC. 26, 1903.

2 SHEETS—SHEET 1.

Witnesses:
H. B. Davis.
Maud M. Piper.

Inventor:
John Bruk
by Noyes & Hemman
Attys

No. 796,986. PATENTED AUG. 15, 1905.
J. BRUK.
LAWN MOWER.
APPLICATION FILED DEC. 26, 1903.
2 SHEETS—SHEET 2.
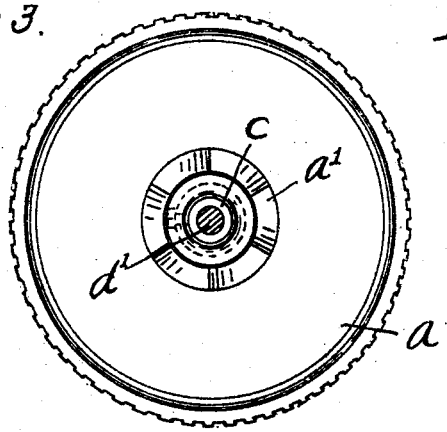
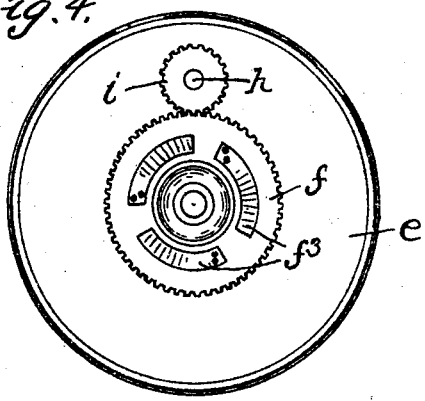
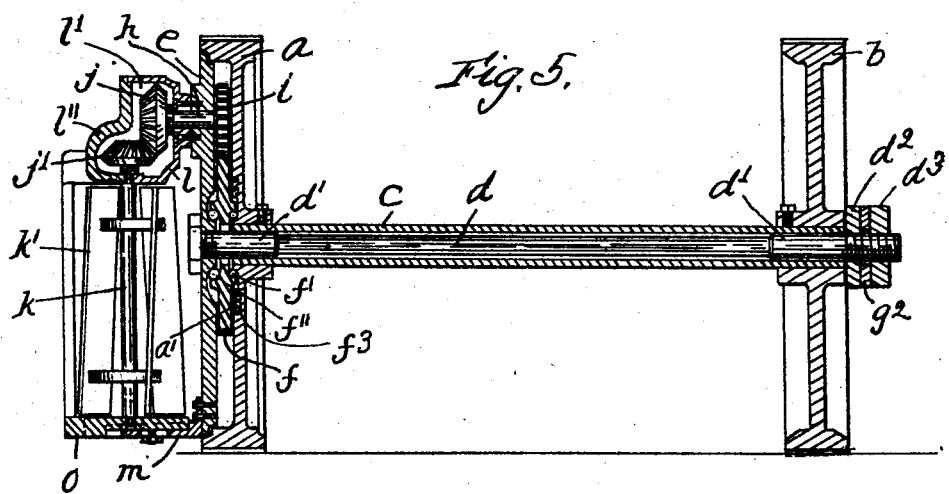
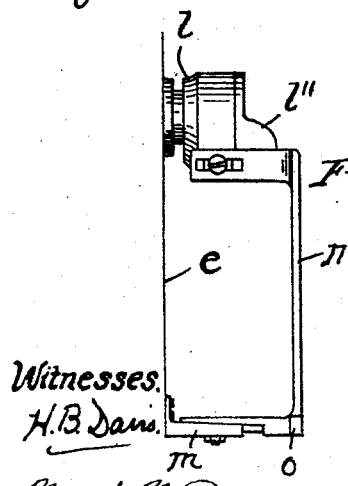
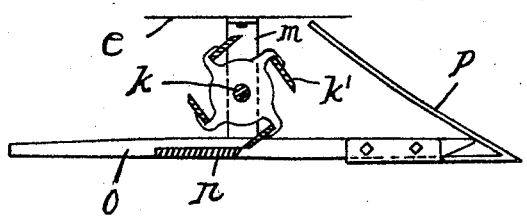
Witnesses.
H. B. Davis
Maud M. Piper
Inventor:
John Bruk
by Noyes & Harriman
Attys

UNITED STATES PATENT OFFICE.

JOHN BRUK, OF POLAND SPRINGS, MAINE.

LAWN-MOWER.

No. 796,986.   Specification of Letters Patent.   Patented Aug. 15, 1905.

Application filed December 26, 1903. Serial No. 186,614.

*To all whom it may concern:*

Be it known that I, JOHN BRUK, of Poland Springs, county of Androscoggin, State of Maine, have invented an Improvement in Lawn-Mowers, of which the following description, in connection with the accompanying drawings, is a specification, like characters on the drawings representing like parts.

This invention relates to a form of lawn-mower particularly adapted to trim the edge portions of lawns or grass-covered beds the surfaces of which lie at some distance above the level of an adjacent walk or way and the edge portion of such surface extending more or less abruptly downward thereto. The grass at the edge of such a lawn usually grows or lies more or less nearly horizontal, so that when the lawn is mowed with an ordinary lawn-mower the mower will not cut the grass at the edge portion, making it necessary to trim such portion by hand.

The object of my invention is to produce a lawn-mower which will enable the grass which lies horizontally, as above described, to be trimmed quickly and easily, thereby rendering trimming by hand unnecessary, and, further, which will enable the edge of the sod to be readily straightened. I accomplish this object by the means hereinafter described, and illustrated in the accompanying drawings, in which—

Figure 1:
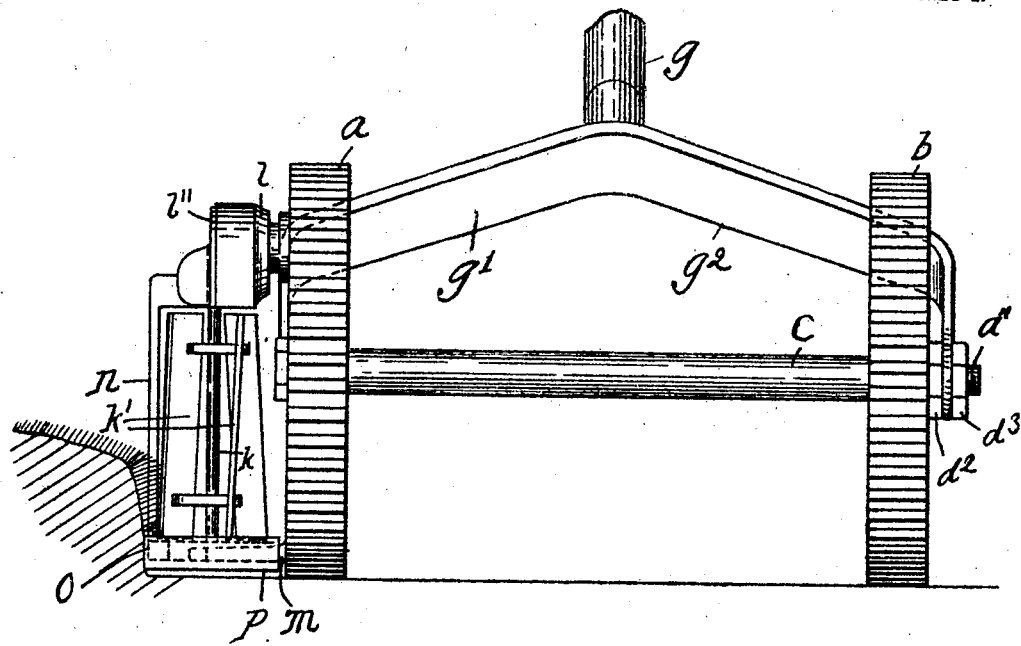
Figure 2:
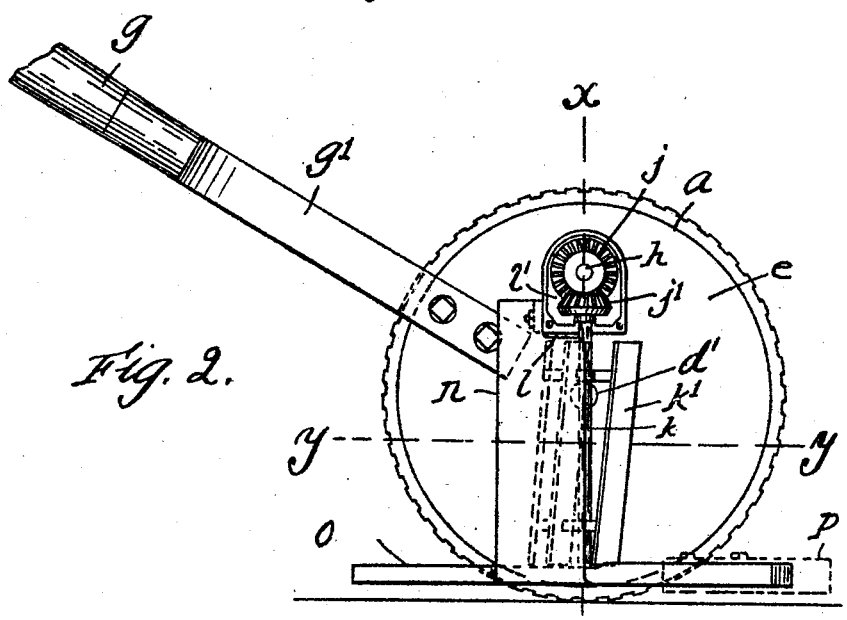

Figure 1 is a front view of my device in the position of use. Fig. 2 is an end view thereof. Fig. 3 is a detail view of one side of one of the driving-wheels. Fig. 4 is a detail view of a portion of the driving-gear. Fig. 5 is a central longitudinal section on the line $x\ x$ of Fig. 2. Fig. 6 is a detail view of the stationary part, which coöperates with the rotary knives. Fig. 7 is a sectional view on the line $y\ y$ of Fig. 2.

The main driving-wheels $a\ b$ are securely mounted upon a tubular shaft $c$ at opposite ends thereof, and a bearing-shaft $d$ is arranged within the shaft $c$, said shaft $d$ having a bearing portion $d'$ at each end thereof for the shaft $c$. The ends of shaft $d$ extend beyond the ends of shaft $c$, and a holder plate or disk $e$ is threaded upon one of said protruding ends and is locked thereon by a nut or other suitable means. The wheel $a$ is recessed on its outer side to receive said disk $e$, so that said disk need not project beyond the outer side thereof to a material extent. A gear $f$ is mounted between the outer side of the wheel $a$ and the inner side of the disk $e$, so that it may rotate freely thereupon, ball-bearings $f'\ f''$ preferably being provided between said wheel and disk, so that said disk will always be held close to but out of contact with the outer side of the wheel $a$. The outer side of the wheel $a$ is provided with a series of ratchet-teeth $a'$, and the inner side of the gear $f$ is provided with a series of spring-pawls $f^3$, arranged to engage said teeth when the wheel $a$ is turned in one direction—that is, when the machine is pushed forwardly.

A handle $g$, having two arms $g'\ g^2$, is provided, the arm $g'$ being securely bolted to the outer side of the disk $e$, as best shown in Fig. 2, and the arm $g^2$ having an aperture in its end, through which the shaft $d$ passes, said arm being locked on the shaft $d$ between suitable lock-nuts $d^2\ d^3$, the inner nut $d^2$ bearing against the hub of wheel $b$ and holding the disk $e$ from moving beyond a certain distance from the wheel $a$.

A shaft $h$ is journaled in the disk $e$ at right angles thereto and parallel to the shaft $d$, said shaft $h$ extending through the disk and having a gear $i$ mounted on its inner end between the disk and wheel $a$, arranged to mesh with the gear $f$, and having on its outer end a bevel-gear $j$, which is adapted to mesh with a bevel-gear $j'$, mounted on the upper end of a shaft $k$. The shaft $k$ is journaled near its upper end in a bracket $l$, secured to the disk $e$, and is stepped in a bracket $m$ at its lower end, likewise secured to said disk. Said bevel-gears $j\ j'$ are located in a chamber $l'$, formed on bracket $l$, the outer side of which is closed by a cap $l''$. The shaft $k$ is provided with a series of blades $k'$, preferably four in number and arranged similarly to the blades in an ordinary lawn-mower. The usual straight-edge or stationary knife $n$ is adjustably secured to the brackets $l$ and $m$, with its edge closely adjacent the path of the cutting edge of the blades $k'$ and approximately in a vertical plane passing through the axis of the wheels $a\ b$.

The bracket $m$ is provided with a guard or gage arm $o$, which extends forwardly and rearwardly from the edge of the stationary knife $n$, its outer side being parallel to the plane of rotation of the wheels $a$ and its under side or edge being held in an approximately horizontal position when the handle is held at the usual angle convenient to the operator when pushing the machine forward. The front end of said guard-arm is preferably provided with a V-shaped plow-point $p$, one section of which is arranged parallel to and nearly flush with the outer side of the guard $o$, and the other section of which extends obliquely inward toward the wheel $a$, preferably beyond the inner side of the path of the knives $k'$. (See Figs. 1 and 7.)

The operation of the above-described device is as follows: As illustrated in Fig. 1, the machine is pushed along on the walk or path at the edge of the lawn or bed with the outer side of guard $o$ against or as close to the edge of the lawn as convenient. The rotation of the wheel $a$ will cause the gear $f$ to be rotated, and this in turn will drive the shaft $h$, causing the knives $k'$ to be rotated. As the horizontally-projecting blades of grass are caught between the stationary knife and the rotating knives they will be trimmed off, as will be obvious, thereby performing work which could not be performed by an ordinary lawn-mower.

The guard $o$ performs several important functions, it serving as a guide and as a guard to prevent the knives $k'$ from striking the sod or trimming the grass too close. The guard may also be manipulated so as to lift the grass into engagement with the knives, and particularly when provided with the plow-point $p$ it may be employed to straighten the edge of the sod by cutting off the uneven portions and pushing them onto the walk far enough to prevent them from clogging or impeding the knife.

Having thus described my invention, what I claim as new, and desire to secure by Letters Patent, is—

1. A lawn-mower comprising a shaft, a holder connected to one end thereof, a handle connected to said holder, a driving-wheel journaled on said shaft at one side of said holder, a knife mounted on the opposite side of said holder to rotate about an axis at an angle to the axis of said wheel, and connections between said wheel and knife whereby the knife will be rotated by the wheel, substantially as described.

2. A lawn-mower comprising a bearing-shaft, a hollow shaft journaled thereon, driving-wheels secured to said hollow shaft, a holder secured to one end of said bearing-shaft, adjacent the outer side of one of said wheels, a knife mounted on the outer side of said holder and rotatable about an axis at an angle to the axis of said wheels, connections between said wheels and knife for causing the knife to rotate upon rotation of said wheels, and a handle connected to said holder and to the opposite end of said bearing-shaft, substantially as described.

3. A lawn-mower comprising a shaft, a holder connected to one end thereof, a handle connected to said holder, a driving-wheel journaled on said shaft at one side of said holder, a knife mounted on the opposite side of said holder to rotate about an axis at an angle to the axis of said wheel, and connections between said wheel and knife whereby the knife will be rotated by the wheel, and a guard connected to said holder and extending parallel with the plane of rotation of the driving-wheel, outside the path of said knife, substantially as described.

4. A lawn-mower comprising a shaft, a holder connected to one end thereof, a handle connected to said holder, a driving-wheel journaled on said shaft at one side of said holder, a knife mounted on the opposite side of said holder to rotate about an axis, at an angle to the axis of said wheel, and connections between said wheel and knife whereby the knife will be rotated by the wheel, and a guard connected to said holder and extending parallel with the plane of rotation of the driving-wheel, outside the path of said knife, the front end of said guard being pointed and having an obliquely-disposed deflecting portion extending rearwardly from said pointed end, substantially as described.

5. A lawn-mower comprising a shaft, a holder connected to one end thereof, a handle connected to said holder, a driving-wheel journaled on said shaft at one side of said holder, a knife mounted on the opposite side of said holder to rotate about an axis at an angle to the axis of said wheel, a gear-wheel arranged to rotate about the axis of said driving-wheel between the latter and said disk, a pawl-and-ratchet connection between said wheels, and connections between said gear-wheel and knife for rotating the latter upon rotation of the former, substantially as described.

In testimony whereof I have signed my name to this specification in the presence of two subscribing witnesses.

JOHN BRUK.

Witnesses:
   LOUIS H. HARRIMAN,
   H. B. DAVIS.